US011645799B2

(12) United States Patent
Kwon et al.

(10) Patent No.: US 11,645,799 B2
(45) Date of Patent: May 9, 2023

(54) SEISMIC VULNERABILITY ANALYSIS SYSTEM OF USER'S LIVING SPACE AND SEISMIC VULNERABILITY ANALYSIS METHOD OF USER'S LIVING SPACE USING THE SAME

(71) Applicant: KOREA INSTITUTE OF GEOSCIENCE AND MINERAL RESOURCES, Daejeon (KR)

(72) Inventors: Jihoe Kwon, Daejeon (KR); Weon-Seo Kee, Daejeon (KR); Dong-Woo Ryu, Daejeon (KR); Joong-Ho Synn, Daejeon (KR); Sangho Lee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 118 days.

(21) Appl. No.: 17/200,460

(22) Filed: Mar. 12, 2021

(65) Prior Publication Data
US 2021/0199828 A1 Jul. 1, 2021

Related U.S. Application Data

(63) Continuation of application No. PCT/KR2019/006672, filed on Jun. 3, 2019.

(30) Foreign Application Priority Data

Sep. 12, 2018 (KR) .................. 10-2018-0109103

(51) Int. Cl.
*G06T 13/20* (2011.01)
*G06F 30/27* (2020.01)
(Continued)

(52) U.S. Cl.
CPC .............. *G06T 13/20* (2013.01); *G01V 1/282* (2013.01); *G06F 30/27* (2020.01); *G06V 20/40* (2022.01); *H04N 7/18* (2013.01); *G06F 2111/18* (2020.01)

(58) Field of Classification Search
CPC ..... G01V 1/282; G06F 30/27; G06F 2111/18; G06V 20/00; G06V 20/40; H04N 7/18;
(Continued)

(56) References Cited

U.S. PATENT DOCUMENTS

2009/0110236 A1* 4/2009 Huang .................... G06T 7/254
382/103
2015/0146988 A1* 5/2015 Oami ..................... G06V 10/42
382/197
2017/0319874 A1* 11/2017 Mead ................... A61N 5/1075

FOREIGN PATENT DOCUMENTS

JP 9-212078 A 8/1997
JP 2004-69598 A 3/2004
(Continued)

OTHER PUBLICATIONS

International Search Report dated Sep. 23, 2019, in connection with corresponding International Patent Application No. PCT/KR2019/006672.
(Continued)

*Primary Examiner* — Richard T Torrente
(74) *Attorney, Agent, or Firm* — Hauptman Ham, LLP

(57) ABSTRACT

Provided is a seismic vulnerability analysis system of a user's living space. The system includes: an image receiving unit configured to receive image information obtained by photographing a living space, where various things are disposed, through a camera; an image signal processing unit configured to recognize the thing photographed in the image information as an object, extract a position and size of the object in a three-dimensional space, and convert the
(Continued)

extracted position and size into spatial information; and an earthquake simulation unit configured to simulate motion phenomena of the objects in the space when an earthquake occurs according to simulated seismic conditions based on the spatial information.

7 Claims, 8 Drawing Sheets

(51) Int. Cl.
  *G01V 1/28* (2006.01)
  *H04N 7/18* (2006.01)
  *G06V 20/40* (2022.01)
  *G06F 111/18* (2020.01)
(58) Field of Classification Search
  CPC ........... G06T 13/60; G06T 13/20; G06T 7/20; G06T 17/10; G09B 25/04; G09B 9/00
  See application file for complete search history.

(56) References Cited

FOREIGN PATENT DOCUMENTS

| | | |
|---|---|---|
| JP | 2017-198867 A | 11/2017 |
| JP | 2017-199017 A | 11/2017 |
| KR | 10-0722938 A | 5/2007 |
| KR | 10-2012-0129301 A | 11/2012 |
| KR | 10-1817637 B1 | 1/2018 |
| KR | 10-1820367 B1 | 1/2018 |
| WO | 2011-132205 A2 | 10/2011 |

OTHER PUBLICATIONS

PCT Written Opinion dated Sep. 23, 2019, in connection with corresponding International Patent Application No. PCT/KR2019/006672.

* cited by examiner

SEISMIC VULNERABILITY ANALYSIS SYSTEM OF USER'S LIVING SPACE AND SEISMIC VULNERABILITY ANALYSIS METHOD OF USER'S LIVING SPACE USING THE SAME

CROSS-REFERENCE TO RELATED APPLICATIONS

This U.S. non-provisional patent application is a continuation of International Patent Application No. PCT/KR2019/006672, filed on Jun. 3, 2019, which claims priority under 35 U.S.C. § 119 of Korean Patent Application No. 10-2018-0109103, filed on Sep. 12, 2018. The disclosures of the above-listed applications are hereby incorporated by reference herein in their entirety.

BACKGROUND

The present invention relates to a seismic vulnerability analysis system of a user's living space and a seismic vulnerability analysis method of a user's living space using the same.

An earthquake measuring 5.8 on the Richter scale, the largest earthquake since the Korean earthquake, occurred on Sep. 12, 2016 in Gyeongju, Gyeongbuk province. Also, on Nov. 15, 2017, an earthquake measuring 5.4 on the Richter scale occurred in Pohang, Gyeongbuk province.

In the Pohang earthquake, the outer wall of the building collapsed due to the earthquake at the Handong Univ. School, and the Pohang Daesung apartment was tilted, resulting in damage of about 67.2 billion won due to the earthquake.

More than anything, 62 people were injured in the accident, including a 70-year-old grandmother at Heunghae-eup, Buk-gu, Pohang.

In order to prevent casualties caused by these earthquakes, the government has provided guidance on how to act in case of an earthquake. However, such guidance in the event of an earthquake is listed only in general terms, so they are not realistic.

To reduce casualties and property damage caused by earthquakes, each person needs a realistic experience of what happens in their living space when an actual earthquake occurs. In other words, it is necessary to recognize the seismic vulnerability of his living space.

However, it is impossible for experts to visit each living space individually to assess the vulnerability of seismic activity. Therefore, there is a need for a method to analyze the seismic vulnerability of each living space more easily.

SUMMARY

The present invention provides a system for analyzing seismic vulnerability of user's living space even if the expert does not visit directly.

In addition, the present invention provides a system for users to experience an earthquake in a user's living space based on the results obtained using the seismic vulnerability analysis system of the user's living space.

An embodiment of the inventive concept provides a seismic vulnerability analysis system of a user's living space, the system including: an image receiving unit configured to receive image information obtained by photographing a living space, where various things are disposed, through a camera; an image signal processing unit configured to recognize the thing photographed in the image information as an object, extract a position and size of the object in a three-dimensional space, and convert the extracted position and size into spatial information; and an earthquake simulation unit configured to simulate motion phenomena of the objects in the space when an earthquake occurs according to simulated seismic conditions based on the spatial information.

In an embodiment, the image signal processing unit may recognize a type of the object through an artificial neural network.

In an embodiment, the image signal processing unit may use information on physical properties of at least one of density, weight, compressive strength, tensile strength, friction coefficient, Young's modulus, Poisson's ratio, and rebound coefficient of the recognized object together with spatial information.

In an embodiment, the image signal processing unit may use information on a binding method for a contact target of the recognized object together with spatial information.

In an embodiment, the system may further include a living space information providing unit configured to provide at least one living space information among an address, the number of floors, an earthquake-resistant design, and geological information of the living space, wherein the earthquake condition may be determined by a strength of an earthquake and the living space information.

In an embodiment, the system may further include a transmission unit configured to provide a simulation process and a result to a display device or a virtual reality (VR) device for indirectly experiencing an earthquake in a living space by providing a process of performing the earthquake simulation to a user.

In an embodiment of the inventive concept, a seismic vulnerability analysis method of a user's living space in a seismic vulnerability analysis system of user's living space including an image receiving unit, an image signal processing unit, and an earthquake simulation unit, the method including: receiving, by the image receiving unit, image information of a user's photographed living space; recognizing, by the image signal processing unit, a thing photographed in the image information as an object, extracting a position and size of the object in a three-dimensional space, and converting the extracted object into spatial information; and simulating, by the earthquake simulation unit, motion phenomena of the objects in the space when an earthquake occurs according to a simulated seismic condition based on the spatial information.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following description of the present invention, a detailed description of known functions and configurations incorporated herein will be omitted when it may obscure the subject matter of the present invention.

The term living space means a residential space including a room and a living room, or an office or a shop that conducts tasks or businesses, and the like. Because people spend most of their day in this living space, understanding the earthquake vulnerability of the space in which you live is directly related to reducing the damage caused by the earthquake. However, it is very difficult for the general public to evaluate the earthquake vulnerability of my living space, and it is impossible for experts to directly evaluate seismic vulnerability of all living spaces due to cost, time, and so on.

The inventor has developed a seismic vulnerability analysis system of the user's living space that allows the general public to easily analyze the seismic vulnerability of his or her living space.

Figure 1:
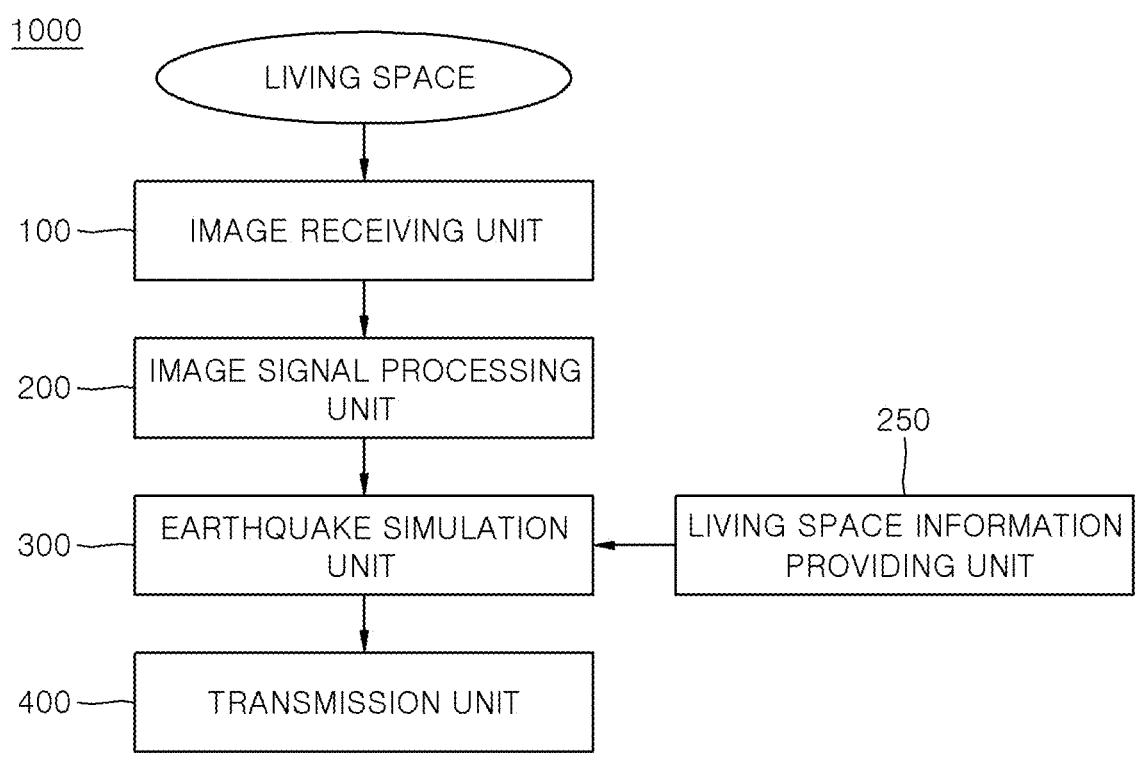
FIG. 1 is a block diagram of a seismic vulnerability analysis system of a user's living space according to an embodiment of the present invention.

FIG. 1 is a block diagram of a seismic vulnerability analysis system 1000 of a user's living space according to an embodiment of the present invention, and FIGS. 2 to 5 illustrate operations of a seismic vulnerability analysis system 1000 of a user's living space according to an embodiment of the present invention.

Based on FIG. 1, the configuration and operation of the vulnerability analysis system 1000 for a user's living space according to an embodiment of the present invention will be described with reference to FIGS. 2 to 5.

A seismic vulnerability analysis system 1000 of a user's living space according to an embodiment of the present invention includes an image receiving unit 100, an image signal processing unit 200, and an earthquake simulation unit 300. Meanwhile, operations performed by the image signal processing unit 200, the earthquake simulation unit 300, and the living space information providing unit 250, which will be described later, may be performed by a processor or a controller on a computer or an information processing device.

Figure 2:
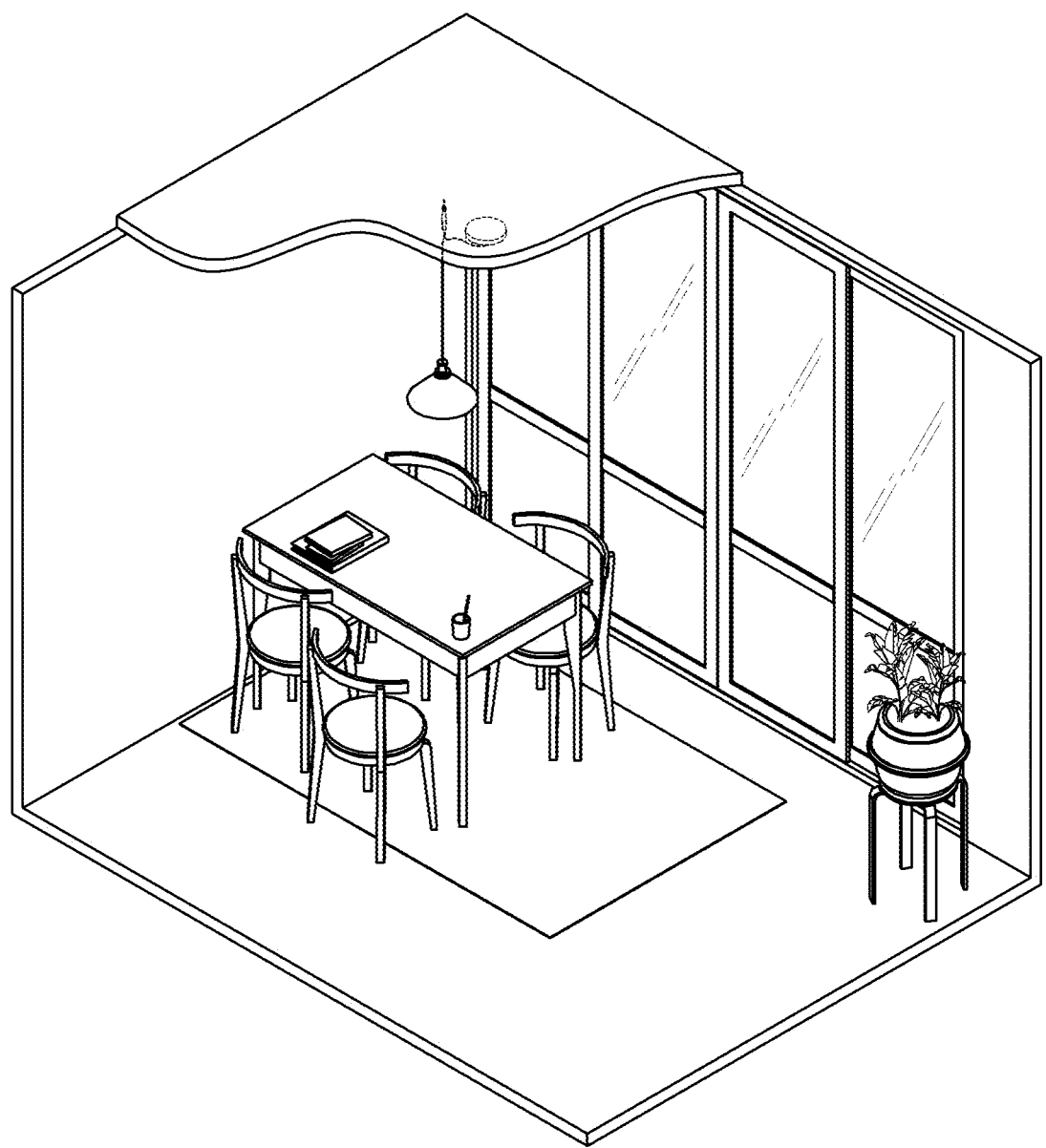
FIG. 2 shows a living space for analyzing seismic vulnerability.

First, there is a living space including various things as shown in FIG. 2. In order to analyze the seismic vulnerability of living space, it is necessary to collect image information on living space. However, in order to analyze more accurate seismic vulnerability, each thing is recognized as an object, and three-dimensional information on living space is needed. Therefore, the camera used in one example of the present invention should be capable of collecting not only two-dimensional information but also image information including three-dimensional information.

For example, the camera may be any one selected from the group consisting of a mono-lens camera, a stereo lens camera, and a depth camera, or a combination thereof. However, the present invention is not limited thereto, and it is also possible to use a device such as Lidar if it is capable of collecting three-dimensional information.

However, the present invention may improve the accessibility to the seismic vulnerability analysis system 1000 of the user's living space according to an embodiment of the present invention by using the camera of the cellular phone, which is generally owned by the general public.

The mono-lens camera may acquire image information including three-dimensional information on the living space by using the difference of the image according to the motion of the camera, in addition to the two-dimensional information on the living space. In addition to the principle of the mono-lens camera, the stereo lens camera analyzes image differences obtained from two lenses to acquire image information including three-dimensional information on the living space in addition to the two-dimensional information on the living space. In addition, the depth camera detects a pattern of infrared rays reflected on an object to acquire image information including three-dimensional information such as RGBD information including depth information in addition to the two-dimensional information on the living space.

The image information acquired through the camera is transmitted to the image receiving unit 100. The image signal received by the image receiving unit 100 is processed for seismic vulnerability analysis in the image signal processing unit 200.

That is, the image signal processing unit 200 analyzes the received image information and recognizes the photographed thing in the image information as an object. Also, the position and volume of each object in the three-dimensional space are extracted and converted into spatial information.

At this time, an object means all targets constituting a space. For example, it includes targets that form the appearance of space such as floors, walls, and ceilings and targets that fill spaces such as tables, chairs, poles, cups, lamps, and books.

In order to recognize a thing photographed in image information as an object, the image signal processing unit 200 of the exemplary embodiment of the present invention may use an artificial neural network, for example, a Convolution Neural Network (CNN).

The image signal processing unit 200 recognizes each thing as an object in the image information. Specifically, the artificial neural network stores each object in the database in the image information, analyzes the image information, and recognizes a thing having the corresponding characteristic as an object. For example, referring to FIG. 4, the image signal processing unit 200 recognizes a table, a chair, a cup, a book, a pollen, a door, and a lamp as an object from the image information of the example of the present invention. At this time, each object is recognized together with information on coordinates and size in three-dimensional space. The method of recognizing an object in the image signal processing unit 200 may use known techniques and is not limited to a specific method.

On the other hand, the image signal processing unit 200 may use the information on the recognized characteristic of the object or the information on the binding method of the contact of the recognized object together with the spatial information. When an object is recognized in the image signal processing unit 200, the image signal processing unit 200 accesses an external database or an internal database and extracts characteristics or binding methods of the object.

The information on the properties of the object means information on at least one physical property of the density, weight, compressive strength, tensile strength, friction coefficient, Young's modulus, Poisson's ratio and coefficient of restitution of the recognized object.

In addition, the information on the binding method for the contact target of the recognized object means whether or not the recognized object is placed, adhered, or hanged by the string on the contact target. By using a clock as an example, if the clock is touching a table, binding relation is recognized as 'put', and if the clock is touching the wall, binding relation is recognized as 'fixed by a nail'. Referring to FIG.

Figure 3:
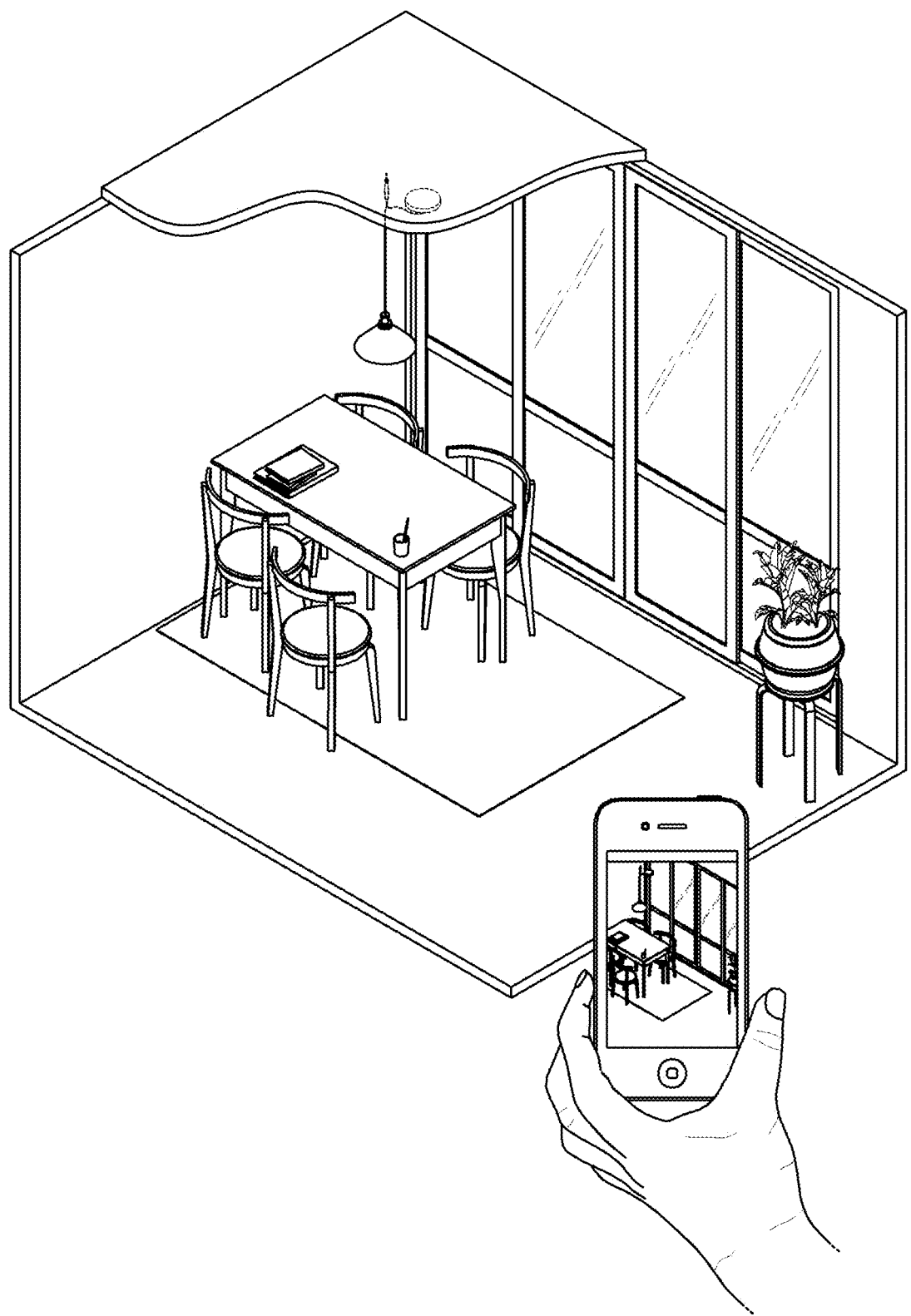
FIG. 3 shows the photographing of a living space using a camera to acquire image information.
Figure 4:
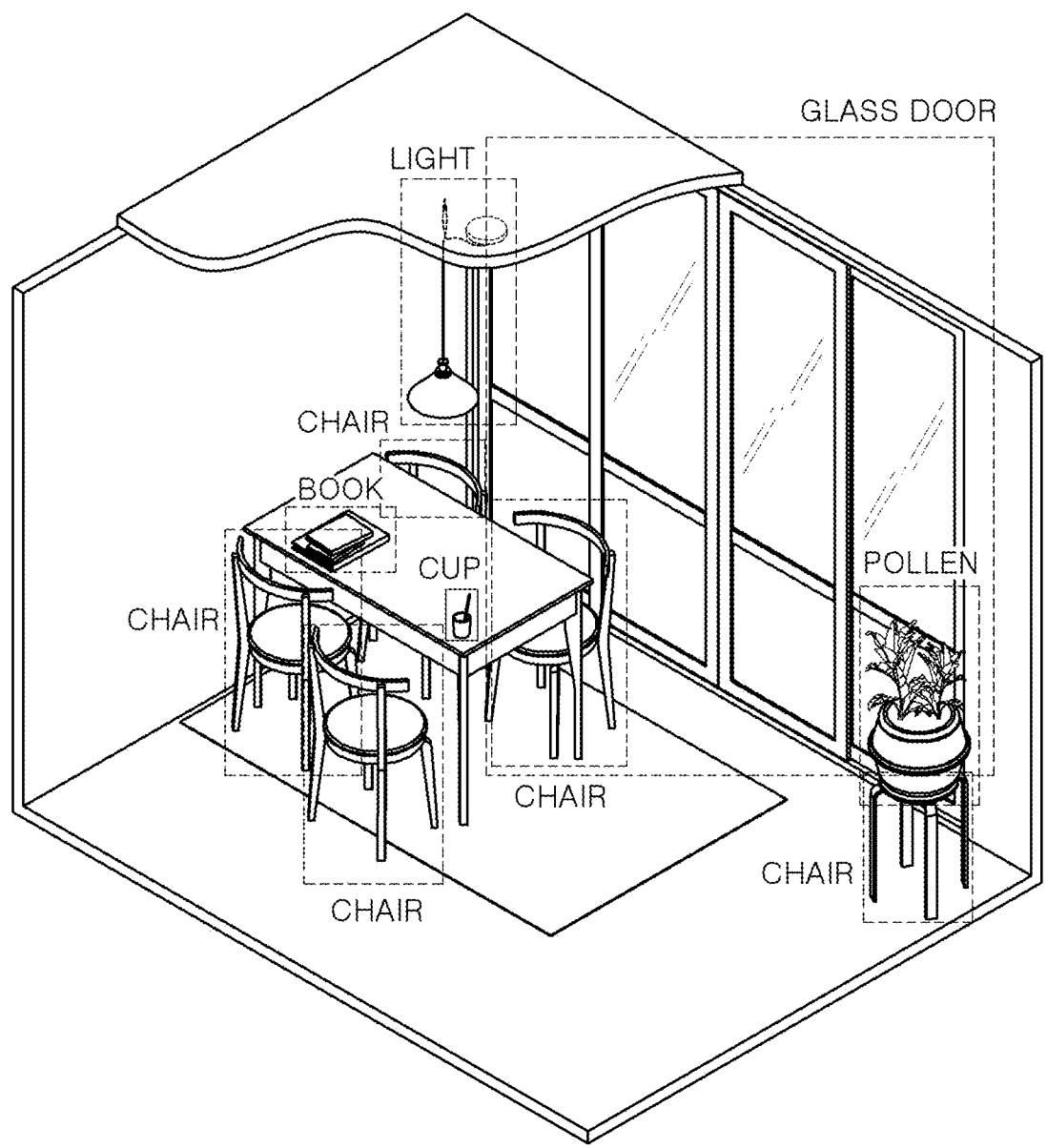
FIG. 4 shows that the image signal processing unit acquires spatial information by recognizing an object included in the living space from the image information.

4, the image signal processing unit 200 recognizes the binding method for the contact target of the object from the image signal as shown in FIG. 3 (for example, the table and the chair are placed on the floor, the cups and books are placed on the table, the pollen is placed on the chair, and the light is hanging on the ceiling by a wire) and uses it together with the spatial information.

On the other hand, the information on not being displayed in one image information may be supplemented through image information obtained from other points or database-based reasoning through general geometric shape prediction. For example, the chair on the upper left of the table of FIG. 3 is not photographed in its entirety, but may be recognized as a chair on the basis of information that a chair is generally placed adjacent to a table and that some shape corresponds to a chair.

In summary, the image signal processing unit 200 recognizes a thing as an object and recognizes information on the type of the object. Further, the image signal processing unit 200 may recognize the size of the object and the coordinates in the three-dimensional space, and may recognize information on the shape of the object. In addition, it may obtain information on the physical properties of each object. And, the image signal processing unit 200 transmits some or all of this information as spatial information to the earthquake simulation unit 300.

The earthquake simulation unit 300 receives the spatial information and performs an earthquake simulation that simulates an earthquake condition for the spatial information.

Earthquake simulation uses dynamic simulation. Unreal Engine, Unity Engine, and Gamemaker may be used as the dynamic simulation. As such, Unreal Engine, Unity Engine, and Gamemaker will be purchased and used by service providers at each site.

Meanwhile, since the seismic conditions in each individual space may be changed not only by the strength of the earthquake but also by the distance from the source, the number of floors, one example of the present invention further includes a living space information providing unit 250 for providing at least one living space information of address of living space, number of floors, seismic design, construction method (masonry, reinforced concrete, etc.) and geological information. The living space information providing unit 250 may receive necessary living space information from a database of the Ministry of Land, Building and Urban Research Information Center, the Institute of Geological Resources and the like, and provide it to the earthquake simulation unit 300.

That is, the earthquake condition of the earthquake simulation unit 300 may be determined by the intensity of the earthquake and the living space information.

The earthquake simulation unit 300 simulates motion phenomena of the objects in the space when an earthquake occurs according to simulated seismic conditions based on spatial information. That is, the earthquake simulation unit 300 detects the collision of each object, and integrates the resultant value calculated by the acting force and the rotational force with time, so that it tracks the motion of the objects by calculating speed and displacement sequentially.

Referring to FIGS. 5-8, the operation according to the progress of the simulation will be described in detail.

Figure 5:
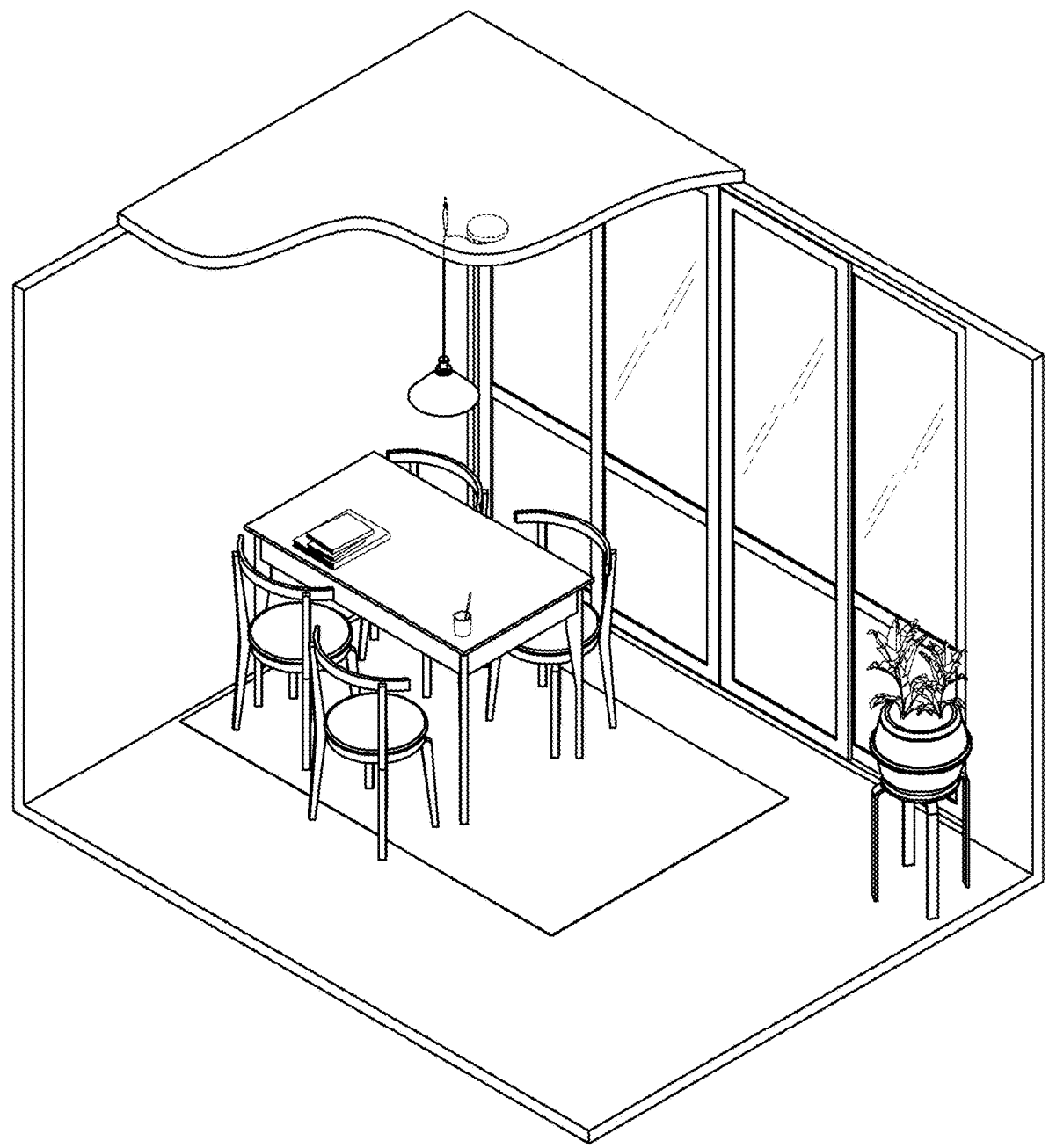
FIGS. 5-8 shows each process of performing an earthquake simulation on spatial information.

First, as shown in FIG. 5, each object is placed in a stable state.

Figure 6:
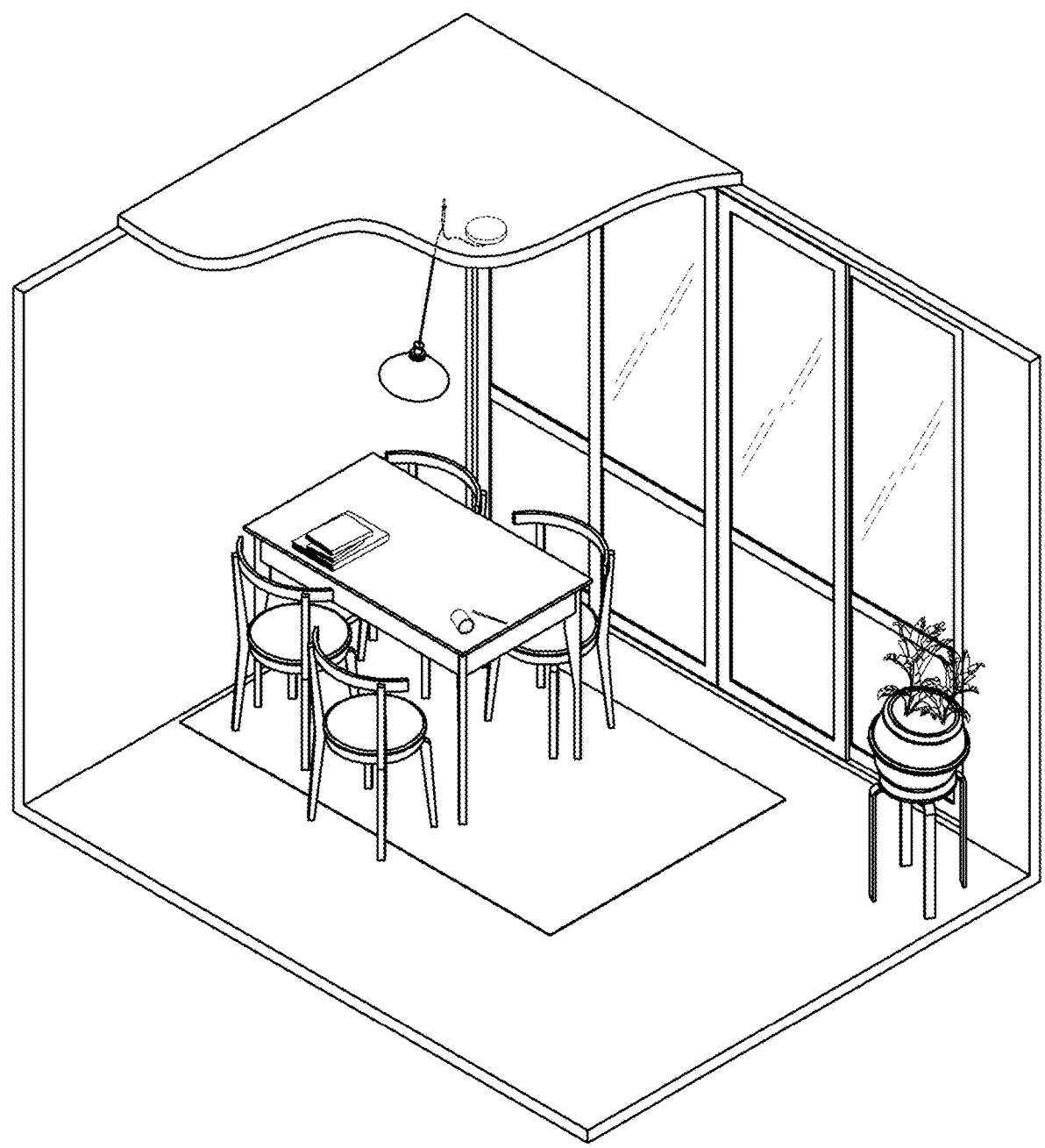

When the simulation starts according to the earthquake condition, as shown in FIG. 6, the light is shaken with the hanging, the pollen placed on the chair also vibrates, and the cup falls. At this time, since the cup is cylindrical, it changes more easily after the fall because of the force and the point of action.

Figure 7:
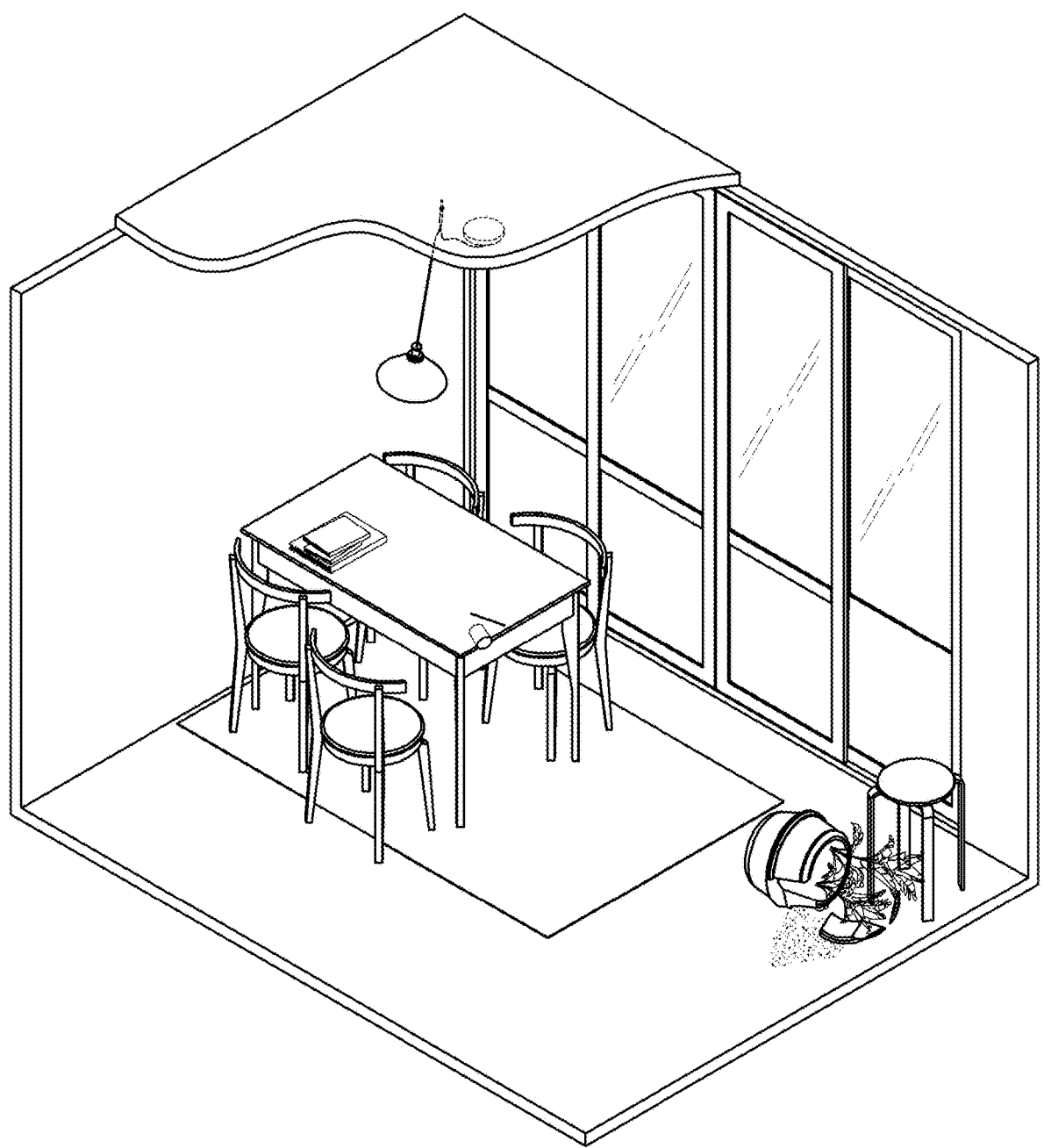

Next, as shown in FIG. 7, the pollen placed on the chair is also dropped. At this time, it is seen that the pollen with cracking characteristics is already cracked.

Figure 8:
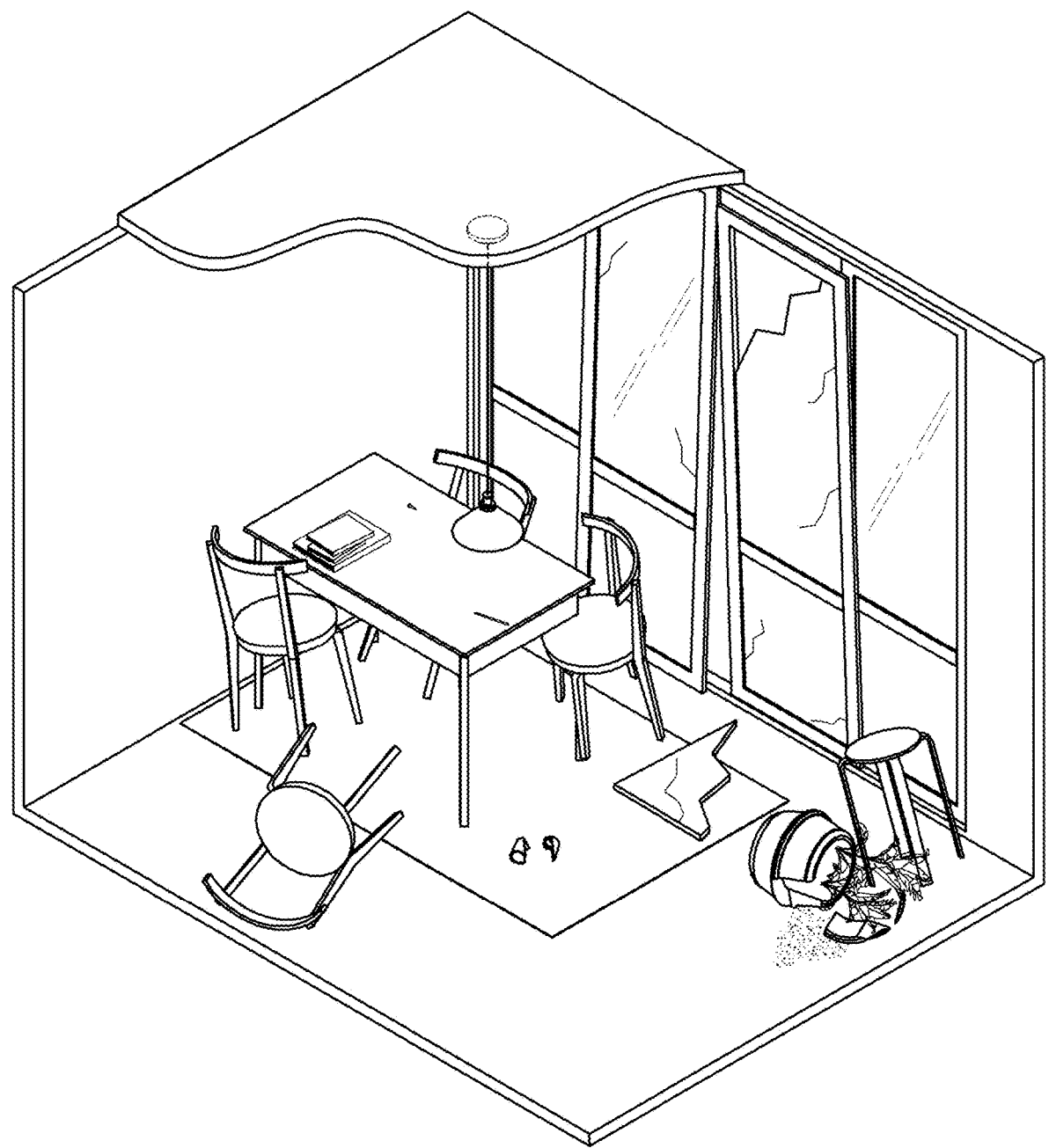

Finally, referring to FIG. 8, it is shown that cracking occurs at the final stage of the cup and door. Also, with the pin removed, it may be seen that the light hanging from the ceiling is also hanging down.

When the earthquake simulation is performed, according to the change of the state of the objects, it is possible to know where the earthquake is expected to cause great damage in the living space. Therefore, by photographing the user's living space using a camera, the user may know which part of his/her living space is vulnerable to earthquake. Therefore, the user may easily compensate for the high seismic vulnerability of his/her living space, thereby preventing the expected damage in case of an earthquake.

Particularly, the user may change the earthquake intensity of the earthquake condition, and may determine what degree of earthquake his or her living space is safe.

On the other hand, the seismic vulnerability of the user's living space may be determined by what degree of length the moving line to the exit due to the fallen furniture becomes after the simulation is performed. For example, if the escape port is blocked, it is converted to 0 point, and if it is within 1 m, it is converted into 10 points, so that the seismic vulnerability of each location in the user's living space may be assessed.

Furthermore, the seismic vulnerability of the user's living space may be determined by the existence of a hiding place that may hide the body during the seismic simulation. For example, in the case of a table having a space in which a person may enter downward, a point of a certain score may be given.

In addition, the seismic vulnerability analysis system of the user's living space according to an exemplary embodiment of the present invention may further include a transmission unit 400 for providing an earthquake simulation process and a result to a display device or a virtual reality device capable of indirectly experiencing an earthquake in a user's own living space by providing a process of performing an earthquake simulation to a user.

The display device or the virtual reality device plays a role of visualizing or realizing the process and result of the earthquake simulation performed in the earthquake simulation unit 300 in a form recognizable by the user.

The display device refers to a mobile phone, a television, a monitor, and the like and forms images of the dynamic simulation through the rendering engine by the earthquake simulation unit 300 and reproduce the image on the display device so that the user may visually confirm the behavior of each object in his or her living space when an earthquake occurs.

The virtual reality device may be composed of a Head Mounted Display (HMD), a VR operation device (joystick or glove), and other safety devices. The virtual reality device tracks the position of the HMD and the VR operation device with a tracking sensor to generate a human model of the user, and includes a human model in the earthquake simulation unit 300 to indirectly experience the process of performing the earthquake simulation or rehearse the action to take in the living space of the user in the event of an earthquake.

Meanwhile, in relation to the seismic vulnerability analysis system 1000 according to an exemplary embodiment of the present invention, the image receiving unit 100, the image signal processing unit 200, the living space information providing unit 250, the earthquake simulation unit 300 and the transmission unit 400 may be implemented by executing a program on a computer. The information and data may be inputted to the computer through a standardization process, and may be operated by a processor.

The seismic vulnerability analysis method of the users living space using the seismic vulnerability analysis system of the user's living space according to one embodiment of the present invention includes receiving image information of a user of the image receiving unit that has photographed his/her living space; recognizing the thing photographed in the image information in the image signal processing unit as an object, extracting the position and size of the object in the three-dimensional space, and converting the extracted object into spatial information; and simulating a motion phenomenon of the objects in the space when an earthquake occurs according to a simulated seismic condition based on the spatial information in the earthquake simulation unit.

At this time, the user may test the seismic vulnerability by changing the seismic conditions for his/her living space.

Also, users using seismic vulnerability analysis method prove the interest of earthquake. Therefore, it may further include notifying the user of seismic vulnerability analysis method when the actual earthquake occurs.

Meanwhile, the seismic vulnerability analysis method of the present invention may provide the seismic simulation process and the result to the adjacent user within the extent that the private information is protected, and it is also possible to analyze the seismic vulnerability of the region through the seismic simulation process and results of multiple users in the similar area.

The method for analyzing the seismic vulnerability of a user's living space according to an embodiment of the present invention may be implemented in a form of a readable program through various computer means and recorded in a computer-readable recording medium. Here, the recording medium may include a program command, a data file, a data structure, or the like, alone or in combination. It may be understood that program instructions stored in the recording medium are specially designed and configured for the present disclosure or are well known to those skilled in computer software and used.

The seismic vulnerability analysis system of the user's living space according to an embodiment of the present invention generates an object in the image signal processing unit based on the information of each user's living space obtained through the living space measuring unit, and analyzes the seismic vulnerability of the living space by dynamically simulating the seismic situation through the dynamics simulation part in objectized living space.

Through analysis of seismic vulnerability of each living space, the user of the living space may compensate the vulnerable place when the earthquake occurs, and reduce the damage caused by the earthquake and property damage.

Further, by using the results of the seismic vulnerability analysis system of the user's living space according to an exemplary embodiment of the present invention, it is possible to provide the user with an opportunity to experience an earthquake in the user's living space.

On the other hand, even if the effects are not explicitly mentioned here, the effects described in the following specification, which are expected by the technical characteristics of the present invention, and the provisional effects thereof are handled as described in the specification of the present invention.

Examples of the computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of various embodiments and vice versa.

The protected scope of the present invention is not limited to the description and the expression of the embodiments explicitly described above. It is again added that the protected scope of the present invention is not limited by obvious changes or substitutions in the technical field to which the present invention belongs.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A seismic vulnerability analysis system of a user's living space, the system comprising:
   an image receiving unit configured to receive image information obtained by photographing a living space, where various things are disposed, through a camera;
   an image signal processing unit configured to recognize the thing photographed in the image information as an object, extract a position and size of the object in a three-dimensional space, and convert the extracted position and size into spatial information; and
   an earthquake simulation unit configured to simulate motion phenomena of the objects in the space when an earthquake occurs according to simulated seismic conditions based on the spatial information.

2. The system of claim 1, wherein the image signal processing unit recognizes a type of the object through an artificial neural network.

3. The system of claim 1, wherein the image signal processing unit uses information on physical properties of at least one of density, weight, compressive strength, tensile strength, friction coefficient, Young's modulus, Poisson's ratio, and rebound coefficient of the recognized object together with spatial information.

4. The system of claim 1, wherein the image signal processing unit uses information on a binding method for a contact target of the recognized object together with spatial information.

5. The system of claim 1, further comprising a living space information providing unit configured to provide at least one living space information among an address, the number of floors, an earthquake-resistant design, and geological information of the living space,
   wherein an earthquake condition is determined by a strength of an earthquake and the living space information.

6. The system of claim 1, further comprising a transmission unit configured to provide a simulation process and a result to a display device or a virtual reality (VR) device for indirectly experiencing an earthquake in a living space by providing a process of performing the earthquake simulation to a user.

7. A seismic vulnerability analysis method of a user's living space in a seismic vulnerability analysis system of user's living space including an image receiving unit, an image signal processing unit, and an earthquake simulation unit, the method comprising:
  receiving, by the image receiving unit, image information of a user's photographed living space;
  recognizing, by the image signal processing unit, a thing photographed in the image information as an object, extracting a position and size of the object in a three-dimensional space, and converting the extracted object into spatial information; and
  simulating, by the earthquake simulation unit, motion phenomena of the objects in the space when an earthquake occurs according to a simulated seismic condition based on the spatial information.

* * * * *